No. 860,343. PATENTED JULY 16, 1907.
P. TOTEMS.
MUD LUG FOR WHEELS OF TRACTION ENGINES.
APPLICATION FILED JAN. 21, 1907.

2 SHEETS—SHEET 1.

Witnesses:
Florian Totems
Moses Totems

Inventor,
Paul Totems

No. 860,343.  
PATENTED JULY 16, 1907.

P. TOTEMS.
MUD LUG FOR WHEELS OF TRACTION ENGINES.
APPLICATION FILED JAN. 21, 1907.

2 SHEETS—SHEET 2.

Witnesses:
Florian Totems
Moses Totems

Inventor,
Paul Totems

UNITED STATES PATENT OFFICE.

PAUL TOTEMS, OF NEW HAVEN, MICHIGAN.

MUD-LUG FOR WHEELS OF TRACTION-ENGINES.

No. 860,343.          Specification of Letters Patent.          Patented July 16, 1907.

Application filed January 21, 1907. Serial No. 353,227.

*To all whom it may concern:*

Be it known that I, PAUL TOTEMS, a citizen of the United States, residing at New Haven, in the county of Shiawassee and the State of Michigan, have invented a new and useful Mud-Lug for the Wheel of a Traction-Engine, of which the following is a specification.

My invention relates to an improved mud lug, for the driving wheel of a traction engine; and the objects of my improvement, are, first, to provide a device attachable to any traction-engine driving wheel of any make or size, except those which have a differential gear in the hub; second, to provide a device in which eight lugs can be adjusted any desired length up to six inches in a few seconds and which when not necessary to be used can be adjusted back in the same time. I attain these objects by the mechanism illustrated in the accompanying drawing in which—

Figure 1:
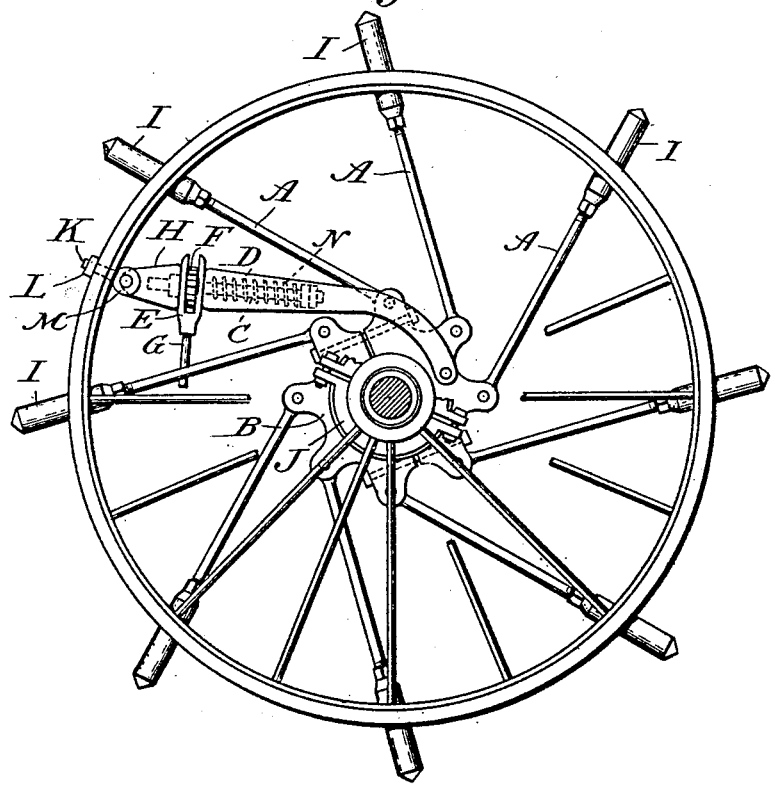
Figure 3:
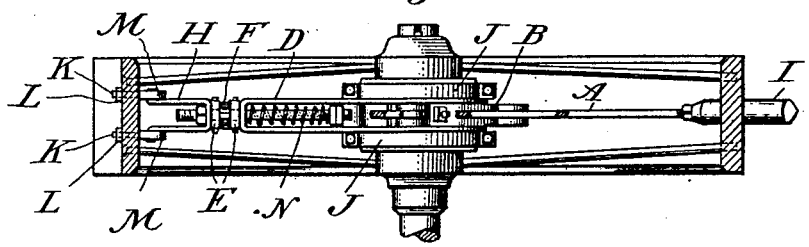
Figure 2:
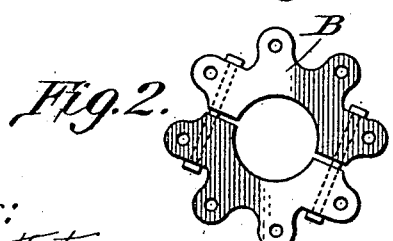
Figure 4:
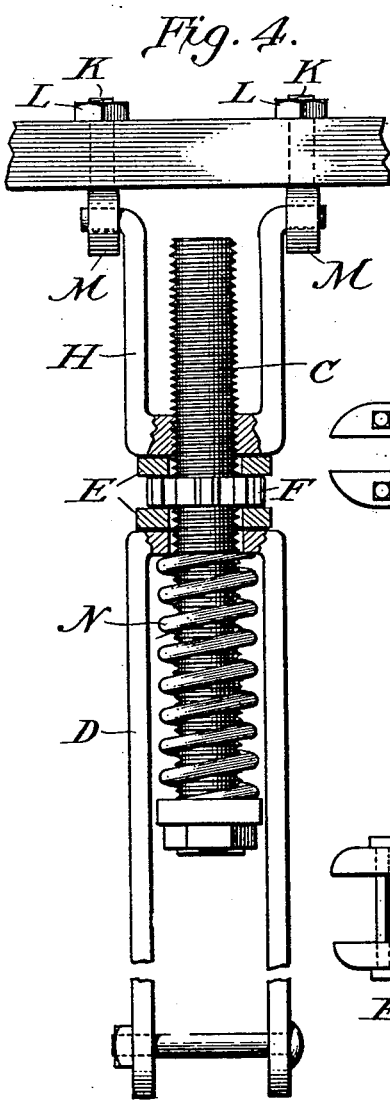
Figure 9:
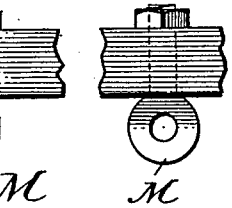
Figure 5:
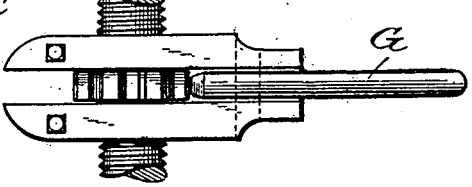
Figure 6:
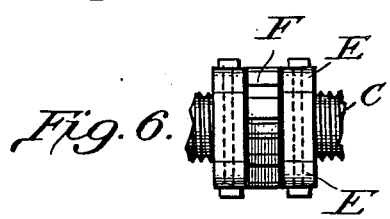
Figure 7:
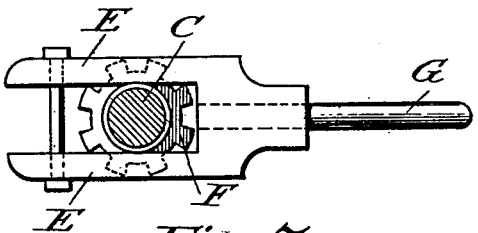
Figure 8:
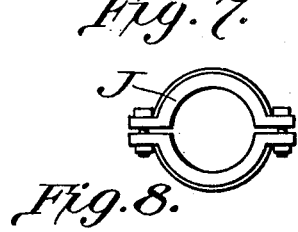

Figure 1, is a side view of the apparatus shown when in place and ready for action. Fig. 2, a side view of the split collar with peripheral lugs; Fig. 3, a transverse section showing an edge view of the device as placed in the wheel; Fig. 4, a detail view of the spiral spring, ratchet wheel, and ratchet frame; Fig. 5, a side view of the ratchet wheel and frame; Fig. 6, an end view of the ratchet block; Fig. 7, a top view of the ratchet wheel and frame; Fig. 8, a collar placed at the hub, one on each side of the split collar "B", to hold the same in place; Fig. 9, a mud lug and connecting rod.

Similar letters refer to similar parts throughout the several views.

The mud lug I is connected to the collar B, by the rod A, the threaded end of which carries a jam nut and is screwed into the mud lug.
"B", is a collar in two parts bolted together around the middle of the hub.

"C" is a bolt which passes loosely through an unthreaded aperture in the parts D and E; the wheel F is fast on the bolt C, which is threaded into the member H; the inner end of the said bolt is surrounded by a spiral spring N, which acts as a cushion when the lug comes in contact with any hard substance.

"D" is a frame having an aperture in its outer end through which passes the bolt C, and the inner ends of the said frame are attached to collar B.

"E" is the frame work of the ratchet as shown in Figs. 4, 5, 6, and 7.

"F" is a ratchet wheel located as shown in Fig. 1, and detailed in Figs. 5, 6, and 7; said ratchet wheel is fast on the bolt C.

"G" is a stationary wrought iron handle cast into the ratchet frame and can be pushed into action at will.

"H" is a wrought iron block threaded to receive the bolt "C" at its inner end and having lugs at its outer ends, one at each side to receive eye-bolts which are secured to the rim of the wheel as shown in Fig. 4.

"I" is a mud lug adapted to pass through a perforation in the rim of the wheel and can be adjusted to any desired length up to six inches.

"J" is a collar in two parts, to be applied at the hub at the side of the split collar "B" to hold the same in place.

"K, K are eye bolts which pass through the rim of the wheel. Each eye bolt has a nut L on its outer end and an eye M, at its inner end to receive a lug of the block H."

When it is desired to extend the lugs, the lever G is caused to engage with the ratchet wheel F. The lever is now turned to the right whereby the bolt C carrying the spiral spring N is screwed into the block H, and the split collar B is rotated to the left. The lugs are thus extended more or less through the rim. They may be drawn in by moving the lever in the opposite direction.

I claim:—

In a traction-wheel the combination with a split collar having peripheral lugs and rotatively mounted on the hub, and connecting rods secured at their inner ends to the lugs and at their outer ends provided with jam-nuts and mud lugs adapted to pass through perforations in the rim of the wheel, of an apparatus to adjust the said mud lugs composed of a connecting frame attached to the split collar, a bolt mounted to slide in the loop of the frame and carrying a spiral spring between its head and the loop of the frame, and a block anchored to the rim, the said bolt being threaded into the block and operated by a ratchet lever attached to the bolt.

PAUL TOTEMS.

Witnesses:
     G. M. EDWARDS,
     ETHEL CHAMBERLIN.